United States Patent [19]

Litt et al.

[11] Patent Number: 4,752,772

[45] Date of Patent: Jun. 21, 1988

[54] KEY-EMBEDDED BRAILLE DISPLAY SYSTEM

[75] Inventors: Timothe Litt, Waltham; William J. Warren, Chelmsford; Dennis M. Williams, Clinton, all of Mass.; Eric E. Litt, Willoughby, Ohio

[73] Assignee: Digital Equipment Corporation, Maynard, Mass.

[21] Appl. No.: 33,358

[22] Filed: Mar. 30, 1987

[51] Int. Cl.$^4$ .............................................. G09B 21/02
[52] U.S. Cl. ..................... 340/712; 340/407; 434/114
[58] Field of Search ................ 340/407, 712, 711; 434/114

[56] References Cited

U.S. PATENT DOCUMENTS

| | | | |
|---|---|---|---|
| 3,395,247 | 7/1968 | Fieldgate | 340/407 |
| 3,831,296 | 8/1974 | Hagle | 340/407 |
| 3,987,438 | 10/1976 | Lindenmueller | 340/407 |
| 4,191,945 | 3/1980 | Hannen et al. | 340/407 |
| 4,194,190 | 3/1980 | Bareau | 340/407 |
| 4,266,936 | 5/1981 | Rose et al. | 340/407 |
| 4,500,293 | 2/1985 | Eltgen | 340/407 |
| 4,679,030 | 7/1987 | Volnak | 340/712 |
| 4,687,444 | 8/1987 | Garner | 340/407 |

FOREIGN PATENT DOCUMENTS 1420629  10/1973  United Kingdom ................ 340/407

Primary Examiner—Howard A. Birmiel
Attorney, Agent, or Firm—Cesari & McKenna

[57] ABSTRACT

A Braille display cell which may be embedded in one of a plurality of keys that are used to provide input to a digital data processor. Cursor controls identify a location in text containing characters, and, in response thereto, the processor produces a Braille actuation signal which identifies the character located at said position. The Braille actuation signal, in turn, generates a Braille indicator of the character on the Braille display cell. With the assistance of the cursor controls, the text can be scanned to cause the Braille indicators corresponding to the characters in the text to appear sequentially on the Braille display cell thereby displaying the text in Braille so that said text can be read tactilely.

6 Claims, 3 Drawing Sheets

KEY-EMBEDDED BRAILLE DISPLAY SYSTEM

BACKGROUND OF THE INVENTION

1. Field of the Invention

This invention generally relates to display terminals which are connected to digital data processors for generating and reading stored alphanumeric text and, more specifically, it relates to mechanical Braille display terminals which are used to generate the stored text and to display the stored text in Braille.

2. Description of the Prior Art

People with serious visual impairments cannot use a computer terminal equipped with only a standard video display. For such people the computer is essentially inaccessible unless they have special equipment which converts the video display to Braille characters which can be read by touch. Two categories of such Braille interface equipment are available. There are Braille printers which will print onto paper the text which normally appears on a screen. They are similar to conventional printers except that they produce embossed Braille characters instead of inked characters. There are also devices known as mechanical Braille displays. They are located in a reading terminal which stands beside or is spatially isolated from the standard keyboard. The mechanical display includes a string or window of Braille display cells which display in raised Braille format a segment of the text which may also appear on a video screen or which may be stored in a hardcopy buffer memory. Each Braille cell is an electromechanical device including an array of pins movably mounted in a block so that the pins ends can be raised above or withdrawn beneath the surface of the block to create the desired Braille character. The user reads the text by electronically moving the window of Braille cells about the video screen or about the hardcopy buffer where the text is stored.

Although both systems help visually impaired people to use computers, each has significant limitations. The limitations of the Braille printers are particularly obvious. Like conventional printers, they are good for printing files but they are impractical for verifying input as it is being generated or for editing existing text. Each view of the text after additions or corrections are made to it requires another printing of the entire contents of the text file. Thus, relying on a Braille printer as a substitute for the video screen makes the computer exceedingly awkward and cumbersome to use.

Mechanical Braille display terminals on the other hand, are more suitable substitutes for the video screen; yet they too impede user efficiency in ways which are not quite so obvious and have largely gone unrecognized. To read what has been typed into the computer, the user shifts one hand away from the keyboard and over to the mechanical Braille display terminal where the text can then be read. Since the user cannot type and read at the same location, using the computer involves many wasted back and forth movements between the reading and the typing terminals. In terms of efficiency, this is analagous to requiring a sighted user to remove his hands from the keyboard before he can view the video display. Restricting the sighted user in such a manner would seriously diminish his efficiency and productivity. Similarly, requiring the visually impaired person to rely on a separate reading terminal significantly limits his efficiency and productivity. Thus, the separate Braille reading terminal imposes a mechanical barrier preventing the visually impaired person from approaching the efficiency and productivity of sighted users.

The significance of the mechanical barrier has gone unrecognized because the limitations on efficiency have been seen as inherent to the visual impairment. The prevailing understanding about how people read Braille taught that a multicell display and thus a separate Braille reading location was necessary. According to this understanding, the visually impaired reader does not read text one character at a time. Rather he reads much like a sighted reader does, by assimilating segments of text. In this manner, the words are perceived not by assembling the individual letters of which they are comprised but instead by seeing the word or phrase as a whole. Thus, when a person reads Braille, he does not identify each letter before moving on to the next one; instead he scans a segment of text with his fingers in an effort to recognize words and phrases. Missed words are reviewed by moving back on the line and rescanning it with the fingers. In this process, the index finger is the primary reading finger. Nevertheless, people have also thought that the other fingers play a role by providing useful preview information of characters before the index finger contacts them. Because the Braille reading process involves "looking" at segments of the line and may involve more than a single reading finger, it has been believed that an effective interface with a computer must therefore use a multicell display which simultaneously displays phrases or segments of the text being read. If a multicell display must be used, then the separate reading location is unavoidable and the consequent limitations on user efficiency naturally follow.

SUMMARY OF THE INVENTION

We recognized that currently available Braille display terminals limit user efficiency and, in an effort to eliminate the limitations, we have discovered that efficient and effective Braille reading does not require a multicell display. Comparable reading speeds and comprehension can be achieved with a single cell display which the user can electronically scan over the target text. As part of our discovery, we have eliminated the inherent inefficiencies associated with a separate Braille reading terminal by integrating the reading function into a key of the standard keyboard. As a consequence, a keyboard which incorporates the invention has led to a more effective terminal design for visually impaired users.

In accordance with these principles, a key on the standard keyboard, preferably the "J" or the "F" key, is modified to incorporate a mechanical Braille display. Thus, the modified key functions as a "J" or "F" key as well as a Braille display. The display comprises a plurality of pins mounted inside the key so that they can be raised and lowered in the key. The ends of the pins rest in holes which pass through the top of the key and which are arranged to yield a two column matrix on the top surface of the key; the other ends of the pins are connected by means of linkages to a plurality of solenoids. When a solenoid is activated, the pin connected thereto rises in the key causing the pin end to extend above the top surface of the key. When the solenoid is deactivated, the pin end retracts below the surface of the key. Any desired Braille character can thus be generated by using the proper control signal to activate the appropriate combination of solenoids.

To use the key-embedded Braille display in connection with a standard computer terminal, interface circuitry well known to those skilled in the art is used to generate a control signal which drives the solenoids. The interface circuitry gives the user the ability to read text character by character. It does this by first identifying, through the use of a reading cursor, a position within text which might normally be displayed on a video screen and then generating a control signal which yields the Braille representation of the information appearing in that position. By means of standard cursor controls the user can move the reading cursor about the text, thereby scanning the text, position by position, to read the information contained in the text. In effect, the cursor controls can simulate the scanning movement of the reading fingers of a Braille reader. However, instead of the finger moving over the text, it remains stationary on the display key and the text passes beneath the finger in response to the cursor controls.

We have conducted field tests of a keyboard which incorporates the single cell Braille display in the "J" key. In comparison to systems using a spatially separate Braille display, users with serious visual impairments find the integrated keyboard to be easier to use and more convenient. Reading speeds at the single cell display are comparable to the reading speeds achievable at the multicell display; but the wasted movements associated with shifting the hands back and forth between the keyboard and a separate reading display are eliminated. Like the sighted user, the visually impaired person can type, verify, read and edit while keeping the hands in the same location. This results in a marked improvement in editing efficiency. The immediate feedback which the user receives through the "J" key leads to improved error rates, quicker discovery of typing errors, and less serious errors. Thus, with the key-embedded Braille display, convenience is enhanced and user productivity increases.

BRIEF DESCRIPTION OF THE DRAWINGS

This invention is pointed out with particularity in the appended claims. Other objects and advantages of the invention may be better understood by referring to the following detailed description, taken in conjunction with the accompanying drawings, in which:

DESCRIPTION OF THE PREFERRED EMBODIMENTS

Figure 1:
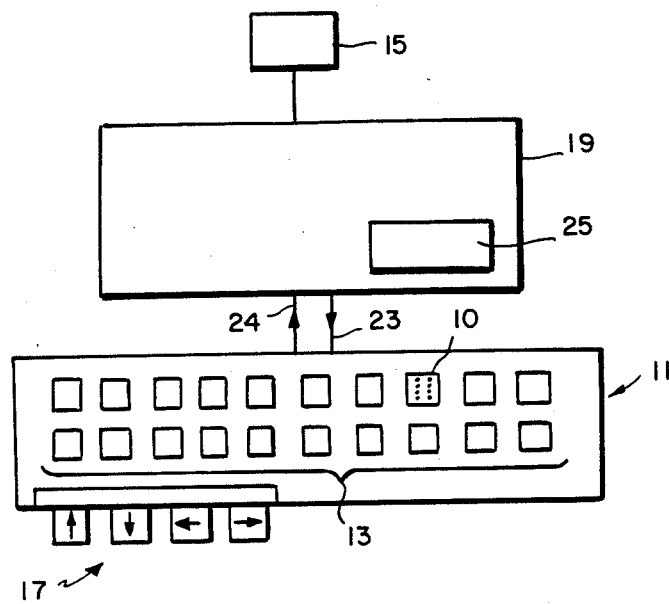
FIG. 1 is a block diagram of a system embodying the invention.

As illustrated in FIG. 1, the system which embodies the invention includes a digital data processor 19 for storing and processing alphanumeric text and a keyboard 11 which has a plurality of keys 13 for generating data input signals 21 for the digital data processor 19. Included among the plurality of keys 19 is a Braille display key 10; it functions as a standard key like any found on a typical keyboard of a computer terminal and it functions as a Braille display as well. In the embodiment described herein, the Braille display key 10 is either the "J" or "F" key on the keyboard 11. These are desirable locations because they are typically the keys on which the user rests his index fingers; thus, the user can easily monitor the Braille information appearing at the display key 10. Of course, the display key 10 can be located elsewhere on the keyboard 11, it can be in more than one location or it can be incorporated into any keypad where a Braille display would be appropriate.

Using standard circuitry well known to those skilled in the art, the system generates a pointer or reading cursor for identifying locations within the stored text. In response to the reading cursor, the digital data processor 19 produces a Braille actuation signal 23 which corresponds to the alphanumeric character located at the identified location in the text. The Braille actuation signal 23, in turn, causes the character to appear at the Braille display key 10 as an array of raised dots which represent the Braille indicator for the character. The system also includes cursor controls 17 by which the user can move the reading cursor about the stored text, thus causing the text to appear one character at a time at the Braille display key 10. Thus, by using the cursor controls 17, a visually impaired user can read the stored text in Braille as it appears at the Braille display key 10.

Figure 2:
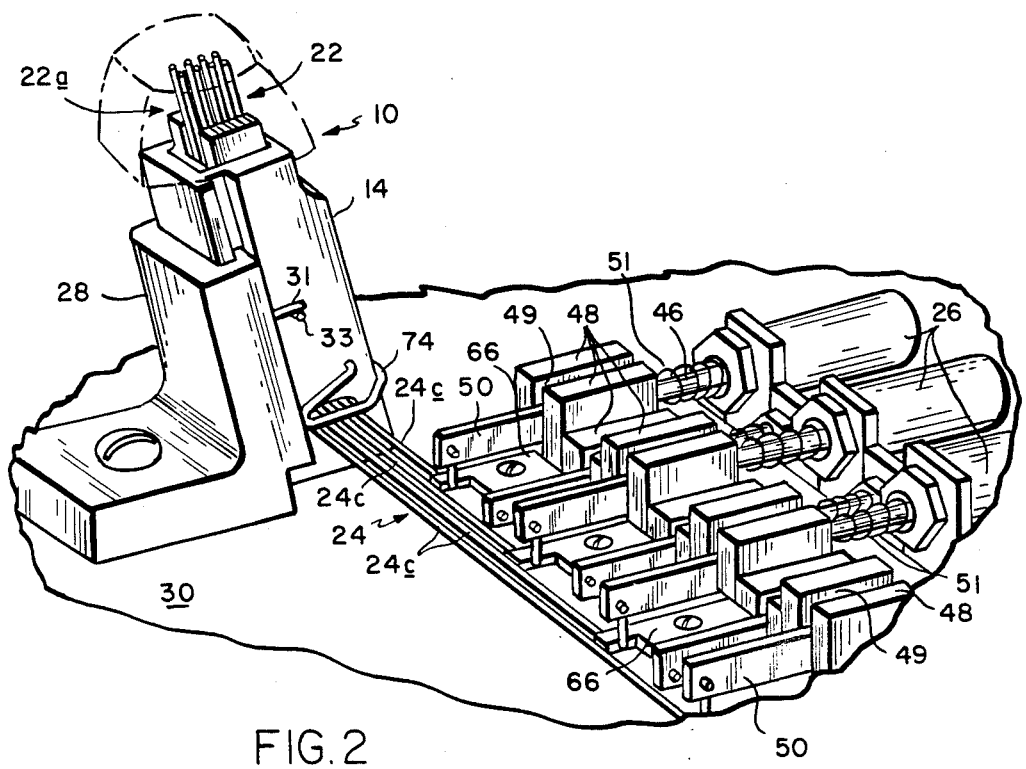
FIG. 2 is an isometric cutaway view of a segment of a keyboard embodying part of the invention with portions removed to more clearly illustrate the interconnection of the components thereof.
Figure 3:
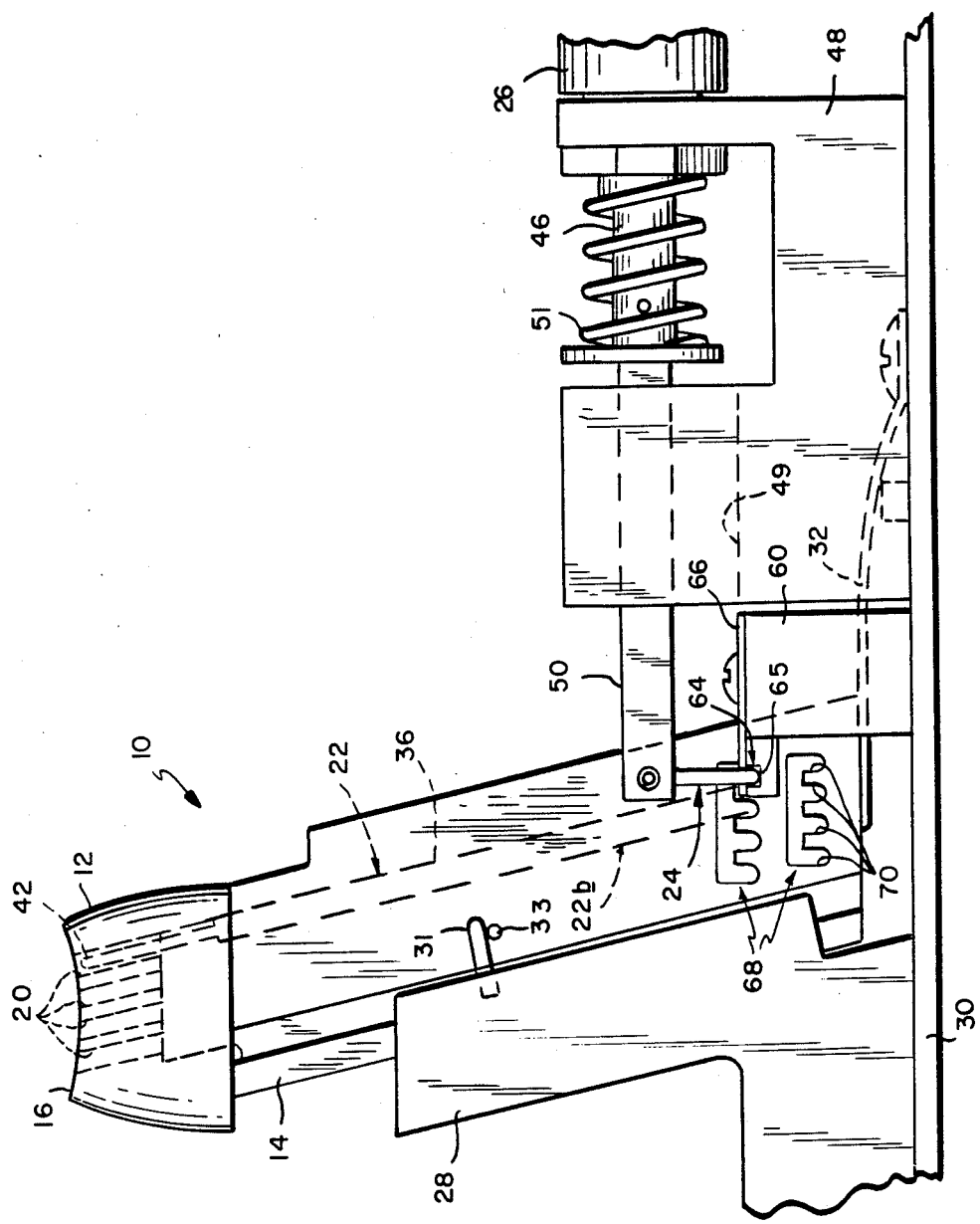
FIG. 3 is a side view of a Braille display key embodying part of the invention with portions removed to more clearly illustrate the interconnections of components thereof.

As illustrated in FIGS. 2 and 3, the Braille display key 10 has a keycap 12 which is fitted onto the top of a keycap holder 14. The keycap 12 has a top surface 16 which the user contacts to depress the key 10. Inside the keycap holder 14 is a cavity 18 (refer to FIG. 4) which extends the length of the holder 14. The keycap 12 has eight holes 20 which are arranged in a 4×2 matrix; the holes 20 penetrate through the keycap 12 connecting the top surface 16 with the cavity 18 in the holder 14. Within the cavity 18 are eight pins 22, only one of which is illustrated in FIG. 3. Each of the pins 22 has an upper end 22a disposed within a corresponding hole 20. The pins 22 are movably mounted in the key 10 to slide back and forth through the holes 20. The lower ends 22b of the pins 22 are connected by means of double-crank rods 24 to corresponding solenoids 26.

By means of the solenoids 26, each of the pins 20 can be individually moved between two positions: a raised position in which the end 22a extends above the top surface 16 of the keycap 12, so that the user can feel it, and a lowered position in which the end 22a lies below the top surface 16, so that the user cannot feel it. By activating the appropriate solenoids 26, any desired 4×2 array of raised and lowered pins 20 can be generated. Thus, the 4×2 matrix of pins 20 can display all of the standard 3×2 Braille character dot patterns in the top 3 rows of the matrix and it can display additional information in the bottom row of the matrix.

The keycap holder 14 is slidably retained on a keyguide 28 so that the holder 14 can move up and down on the guide. As further illustrated in FIG. 4, the keyguide 28, in turn, is affixed to a platform 30. A leaf spring 32, mounted on the platform 30, urges the holder 14 upward. A first stop pin 31 set into the back of the keyguide 28 limits the upward movement of the keycap holder 14 by contacting a second stop pin 33 set into the side of the holder 14.

Figure 4:
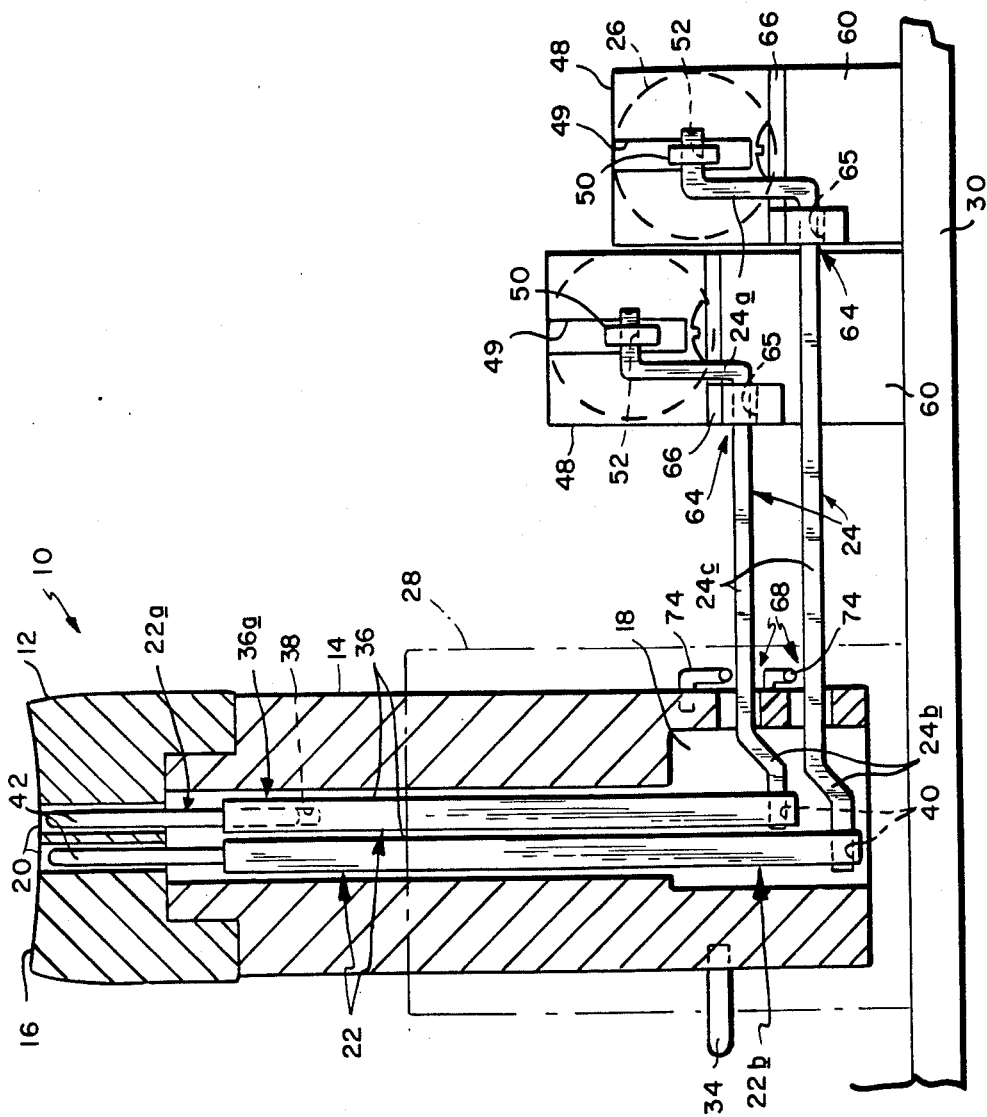
FIG. 4 is a cutaway front view of a segment of the keyboard containing the Braille display key with portions removed to more clearly illustrate the interconnection of components thereof.

Also affixed to a side of the holder 14 is a switch pin 34 (refer to FIG. 4). When the user depresses the key 10, the switch pin 34 activates a switch, not shown in the drawings, to cause a data input signal to be sent to the digital data processor. The data input signal corresponds to the normal actuating signal of the "J" or "F" key, whichever is appropriate.

As illustrated in FIG. 4, each pin 22 comprises a narrow square peg 36 with an axial recess 38 in its upper end 36a and a tranverse hole 40 through its lower end 22b. A dowel 42 snuggly fits in recess 38. In the assembled key 10, the dowels 42 are within corresponding holes 20 in the keycap 12. Downward movement of the pins 22 is limited by the crank rods 24, which pass through the holes 40.

The solenoids 26 are held in place by solenoid mounts 48 attached to the platform 30. Each solenoid 26 has a plunger 46 which moves in or out in response to the Braille actuation signal 23. Pivotally connected to the outer end of each plunger 46 is a push rod 50. The push rods 50 are guided by slots 49 extending through the solenoid mounts 48 and permitting up and down pivoting of the rods 50 about the ends of the plungers 46. The other end of each push rod 50 is coupled to a crank arm 24a at one end of a crank rod 24 by means of a hole 52 through the push rod 50. The solenoids 26 are arranged in a staggered row extending away from one side of the keyguide 28 so that the solenoids 26 and the corresponding crank rods 24 do not interfere with each other (refer to FIG. 2).

A crank arm 24b at the other end of each crank rod 24 couples to a pin 22 by means of the hole 40. As illustrated in FIG. 4, each rod 24 has a central shaft 24c supported at opposite ends in bearings 64 and 68 so that the rod 24 can freely rotate about the axis of its central shaft 24c. Thus, the crank rods 24 convert linear movement of the solenoid plungers 46 to rotation and convert the rotation back to linear displacement of the pins 22.

More specifically, each of the bearings 68 comprises vertical slots 70 extending through the side of the keycap holder 14 and a keeper 74 that retains the shafts 24c against the bottoms of the slots 70. Furthermore, each of the bearings 64 comprises a groove 65 located in a support block 60. The groove 65 loosely accommodates the shaft 24c, and a retainer plate 66 is secured to the support block 60 over the top of the groove 65. When the keycap 12 is depressed to operate the key 10, the keepers 74 cause the shafts 24c to follow the up and down movement of the keycap holder 14 and the loose fitting bearings 64 permit the rods 24 to easily follow that movement. Thus, the keycap holder 14 can slide up and down on the keyguide 28 without affecting the relative positions of the pins 22 within the holes 20.

Activation of the solenoid 26 causes the corresponding pin 22 to rise in the holder 14 so that the end 22a appears above the top surface 16 of the keycap 12. This occurs in the following manner. When the solenoid 26 is activated by a control signal, the plunger 46 retracts into the solenoid 26 thereby pulling the crank arm 24a toward the solenoid 26. This rotates the shaft 24c and the crank arm 24b. The crank arm 24b, in turn, moves the connected pin 20 upward in the holder 14, thereby causing the upper end of the dowel 42 to extend above the top surface 16 of the keycap 12. When the solenoid 26 is deactivated, a return spring 51 urges the plunger 46 back into its rest position and the crank rod 24 retracts the upper end of the dowel 42 back into the keycap 12. By applying the appropriate actuation signal to the solenoids 26, any desired Braille pattern of raised pins 20 can thus be achieved.

Referring to FIG. 1, standard circuitry, well known to those skilled in the art, generates the actuation signal 23 which drives the Braille display key 10. In the embodiment described herein, the keyboard 11 including the Braille display key 10 is used as a substitute for, or in conjunction with, a video display terminal 15, thus, the system has the following features. The system includes a memory 25 for storing the alphanumeric text which is typed in at the keyboard 11 and which is normally displayed on the video screen. To the visually impaired user, the memory 25 constitutes a virtual screen analogous to the video display. With the assistance of the Braille display key 10, the user "looks" at locations on the virtual screen and reads the information stored there. To accomplish this, the circuitry generates a conventional pointer or reading cursor which identifies a user selected location in memory 25. Then the circuitry conveys the information stored at that location to the Braille display key 10 where it appears as the equivalent Braille representation. The user can move the reading cursor to a different location in memory 25 by means of cursor control circuitry 17 which offers standard up-down, left-right cursor control. By scanning the reading cursor from left to right on the virtual screen, the stored characters on the line will sequentially appear at the Braille display key 10. Scanning in such a manner simulates the movement of the reading finger across a line of Braille text on a page of paper. Missed information can be reexamined by moving the reading cursor back to the left and then scanning to the right again. Thus, by using the reading cursor controls, the user can read the information stored in memory.

So that the visually impaired user can tell how the information would appear on a video screen, the circuit can be configured to add markers to the text stored in the memory 25 which identify the borders of the video terminal display 15. The markers can be a predetermined array of raised pins on the Braille display key 10. When the cursor control moves the reading cursor to the edge of the video screen, the marker will appear at the Braille display key 10 indicating that the user has reached a video screen border.

Although a linear solenoid actuating mechanism has been described herein, it is well known within the art that other alternative actuating mechanisms with appropriate connecting means could be substituted for linear solenoids and produce substantially the same results. For example, rotary solenoids, stepping motors, servo motors, pneumatic actuators and hydraulic actuators might be used instead of the linear solenoids. In addition, the actuation mechanism might be incorporated into the key 10, thereby reducing the space required for the key-embedded display. Mechanisms which would be suitable for incorporation into the key assembly are piezoelectric motors, memory metal actuators and micro-miniaturized solenoids.

We claim:

1. A Braille display system comprising:
  A. a digital data processor for storing and processing alphanumeric text;
  B. a keyboard having a plurality of keys for generating input to said processor, said plurality of keys including a Braille display key; and
  C. a cursor control means, said processor responding to said cursor control means by identifying a location in said text and providing a Braille actuation signal corresponding to the character in the identified location in said text, and said Braille display key being arranged to provide a Braille indicator of the character in the identified location in said text in response to said Braille actuation signal, whereby, use of said cursor control means to sequentially identify locations within said text causes said text to appear at said Braille display key as sequential Braille indicators of said text so that said text can be read in Braille.

2. A Braille display system as defined in claim 1 wherein:
A. said keys cause the generation of said input when said keys are individually depressed, said input identifying the particular key which was depressed; and
B. said Braille display key includes:
1. a top surface having a plurality of holes;
2. a plurality of pins movably mounted within said display key, each of said pins being movable between a raised position in which said pin extends upwardly through one of said holes to project above said top surface and a lowered position in which the entire pin is below said top surface;
3. a plurality of actuating means responsive to said Braille actuation signal, said actuating means being coupled to said plurality of pins to move said pins between the raised and lowered positions in response to said Braille actuation signal thereby producing said Braille indicator.

3. A Braille display system as defined in claim 1 wherein:
A. said keys cause the generation of said input when said keys are individually depressed, said input identifying the particular key which was depressed; and
B. said Braille display key includes:
1. a holder having a plurality of first bearings and supporting a keycap which has a top surface, said top surface having a plurality of holes;
2. a keyguide on which said holder is slidably retained so that said holder can slide up and down on said keyguide;
3. a spring urging said holder upward on said guide;
4. a plurality of pins movably mounted on said holder, each of said pins being movable between a raised position in which said pin extends upwardly through one of said holes to project above said top surface and a lowered position in which the entire pin is below said top surface;
5. a plurality of double-crank rods having first crank arms and second crank arms separated by central shafts, said first crank arms being coupled to said pins, said center rods passing through and being supported by said first bearings so that rotation of said shafts moves said pins between said raised and lowered positions and said shafts move up and down with said holder without changing the vertical positions of said pins relative to said top surface; and
6. a plurality of solenoids responsive to said Braille actuation signal, said second crank arms being coupled to said solenoids so that said Braille actuation signal causes rotation of said shafts, thereby producing said Braille indicator.

4. A Braille display keyboard which can be connected to a digital data processor arranged to store and process alphanumeric text, and having cursor control means, said processor responding to said cursor control means by identifying a location in said text and providing a Braille actuation signal corresponding to the character in the identified location in said text, said keyboard comprising a plurality of keys for generating input for the digital data processor, said plurality of keys including a Braille display key, said Braille display key being arranged to provide a Braille indicator of the character in the identified location in said text in response to said Braille actuation signal.

5. A Braille display keyboard as defined in claim 4 wherein:
A. said keys cause the generation of said input when said keys are individually depressed, said input identifying the particular key which was depressed; and
B. said Braille display key includes:
1. a top surface having a plurality of holes;
2. a plurality of pins movably mounted within said display key, each of said pins being movable between a raised position in which said pin extends upwardly through one of said holes to project above said top surface and a lowered position in which the entire pin is below said top surface;
3. a plurality of actuating means responsive to said Braille actuation signal, said actuating means being coupled to said plurality of pins to move said pins between the raised and lowered positions in response to said Braille actuation signal thereby producing said Braille indicator.

6. A Braille display keyboard as defined in claim 4 wherein:
A. said keys cause said input to generate when said keys are individually depressed, said input identifying the particular key which was depressed; and
B. said Braille display key includes:
1. a holder having a plurality of first bearings and supporting a keycap which has a top surface, said top surface having a plurality of holes;
2. a keyguide on which said holder is slidably retained so that said holder can slide up and down on said keyguide;
3. a spring urging said holder upward on said guide;
4. a plurality of pins movably mounted on said holder, each of said pins being movable between a raised position in which said pin extends upwardly through one of said holes to project above said top surface and a lowered position in which the entire pin is below said top surface;
5. a plurality of double-crank rods having first crank arms and second crank arms separated by central shafts, said first crank arms being coupled to said pins, said center rods passing through and being supported by said first bearings so that rotation of said shafts moves said pins between said raised and lowered positions and said shafts move up and down with said holder without changing the vertical positions of said pins relative to said top surface; and
6. a plurality of solenoids responsive to said Braille actuation signal, said second crank arms being coupled to said solenoids so that said Braille actuation signal causes rotation of said shafts, thereby producing said Braille indicator.

* * * * *